US011012467B2

(12) United States Patent
Maslak et al.

(10) Patent No.: US 11,012,467 B2
(45) Date of Patent: May 18, 2021

(54) SYSTEM AND METHOD FOR SCRUBBING DNS IN A TELECOMMUNICATIONS NETWORK TO MITIGATE ATTACKS

(71) Applicant: Level 3 Communications, LLC, Broomfield, CO (US)

(72) Inventors: Joelle T. Maslak, Golden, CO (US); Todd J. Williamson, Denver, CO (US); Kevin Brady, Denver, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 301 days.

(21) Appl. No.: 15/881,481

(22) Filed: Jan. 26, 2018

(65) Prior Publication Data

US 2018/0219912 A1  Aug. 2, 2018

Related U.S. Application Data

(60) Provisional application No. 62/451,438, filed on Jan. 27, 2017.

(51) Int. Cl.
*H04L 29/06* (2006.01)

(52) U.S. Cl.
CPC ...... *H04L 63/1441* (2013.01); *H04L 63/0281* (2013.01); *H04L 63/1425* (2013.01); *H04L 63/1458* (2013.01)

(58) Field of Classification Search
CPC ............. H04L 63/1441; H04L 63/1425; H04L 63/1458; H04L 63/14–1491; H04L 63/02–0281
See application file for complete search history.

(56) References Cited

U.S. PATENT DOCUMENTS 8,291,117 B1 * 10/2012 Eggleston ........... H04L 61/1511
                                              709/245
9,756,071 B1 *  9/2017 Golshan ............. H04L 63/1458
(Continued)

FOREIGN PATENT DOCUMENTS

CN        105119906 A      12/2015
CN        105939347 A       9/2016

OTHER PUBLICATIONS

International Preliminary Report on Patentability, dated Jul. 30, 2019, Int'l Appl. No. PCT/US18/015550, Int'l Filing Date Jan. 26, 2018; 12 pgs.

(Continued)

*Primary Examiner* — Madhuri R Herzog

(57) ABSTRACT

Aspects of the present disclosure involve systems, methods, computer program products, and the like, for providing a proxy server or scrubbing service for an authoritative domain name server (DNS) of a CDN to prevent or otherwise mitigate attacks on the server. The proxy server may receive incoming requests to the authoritative DNS and determine which requests are valid and which are potentially part of an attack on the network. In one embodiment, the proxy server may then "scrub" or otherwise remove the requests of the attack to mitigate the effect of the attack on the network. For example, the proxy server may ignore the request, may direct the request to a "dead-end" server or other device to prevent overloading of the target device, may instruct a device from which the request was sent to discard the request, etc.

19 Claims, 6 Drawing Sheets

(56) References Cited

U.S. PATENT DOCUMENTS

| | | | |
|---|---|---|---|
| 2003/0070096 A1* | 4/2003 | Pazi | H04L 63/1458 |
| | | | 726/4 |
| 2005/0044352 A1* | 2/2005 | Pazi | H04L 63/08 |
| | | | 713/153 |
| 2007/0005689 A1 | 1/2007 | Leighton et al. | |
| 2010/0042725 A1* | 2/2010 | Jeon | H04L 29/12066 |
| | | | 709/226 |
| 2010/0131646 A1 | 5/2010 | Drako | |
| 2012/0117621 A1 | 5/2012 | Kondamuru et al. | |
| 2012/0303808 A1 | 11/2012 | Xie | |
| 2013/0311677 A1* | 11/2013 | Coulson | H04L 61/1511 |
| | | | 709/245 |
| 2015/0180892 A1 | 6/2015 | Balderas | |
| 2015/0215334 A1* | 7/2015 | Bingham | H04L 63/1425 |
| | | | 726/23 |
| 2015/0264009 A1 | 9/2015 | Scharber | |
| 2015/0326665 A1 | 11/2015 | Carney | |
| 2016/0218978 A1* | 7/2016 | Lapidous | H04L 61/6009 |
| 2016/0255012 A1 | 9/2016 | Mizrachi | |

OTHER PUBLICATIONS

International Search Report and Written Opinion of the International Searching Authority, dated Apr. 9, 2018, Int'l Appl. No. PCT/US18/015550, Int'l Filing Date Jan. 26, 2018; 13 pgs.
Extended European Search Report, dated Jun. 23, 2020, Application No. 18745117.4, filed Jan. 26, 2018; 9 pgs.

* cited by examiner

SYSTEM AND METHOD FOR SCRUBBING DNS IN A TELECOMMUNICATIONS NETWORK TO MITIGATE ATTACKS

CROSS-REFERENCE TO RELATED APPLICATIONS

This application is related to and claims priority under 35 U.S.C. § 119(e) from U.S. Patent Application No. 62/451,438, filed Jan. 27, 2017, titled "SYSTEM AND METHOD FOR SCRUBBING DNS IN A TELECOMMUNICATIONS NETWORK TO MITIGATE ATTACKS," the entire content of which is incorporated herein by reference for all purposes.

TECHNICAL FIELD

Embodiments of the present invention generally relate to systems and methods for implementing a telecommunications network, and more specifically for mitigating an attack on the telecommunications network by scrubbing out potentially harmful requests to the network.

BACKGROUND

The Internet and the World Wide Web (the "Web") are ubiquitous and easily accessible using numerous possible devices. Content providers (publishers) now use the Internet (and, particularly, the Web) to provide all kinds of content to numerous users throughout the world. In order to offload the job of serving some or all of its content, many content providers now operate or subscribe to content delivery networks (CDNs). Using a CDN, content can be served to clients from the CDN (i.e., from one or more content servers in the CDN) instead of from the content provider's server(s). In a caching CDN, content may also be cached on some or all of the CDN servers, either before being served or in response to specific requests for that content. Having content cached enhances the performance of the CDN because the content does not have to be retrieved from origin servers or other locations, which are less efficient than edge servers in providing content.

Numerous forms of content may be served from the CDN. For example, television shows and movies may now be accessed from any number of Web sites, and the shows and movies may be served from the CDN. Print newspapers have migrated to the Web and provide portals through which clients operating some form of computing device (e.g., PC, smart phone, or tablet), with a browser may access numerous forms of content, such as short video clips, articles, images, and audio tracks. Software updates and patches, once provided on disc and mailed to recipients, are now routinely distributed to devices from a CDN through one or more network connections and devices.

In some instances, CDNs may suffer an attack by an actor to gain access to the network or to disrupt the operation of the network. A denial of service (DOS) attack is an attempt to make content servers or other resources of a company unavailable to legitimate users. In general, such attacks include flooding a content server with phony requests for information from the content server at such a frequency to impede other legitimate traffic or requests from being fulfilled by the content server. A distributed denial of service (DDOS) attack is similar except that the requests for the content are received from more than one, often thousands, of unique Internet Protocol (IP) addresses. As should be appreciated, such attacks may negatively impact the ability of the CDN to provide content to legitimate customers.

SUMMARY

One implementation of the present disclosure may take the form of a method for operating a telecommunications network. The method may include obtaining request records from a domain name server (DNS) of a content delivery network (CDN), the DNS being of a DNS architecture of the CDN and creating a DNS request result file comprising a plurality of Uniform Resource Locator (URL) addresses and associated plurality of Internet Protocol (IP) addresses at which requested content of the CDN is accessible to a requesting device. The method may also include receiving a first DNS request intended for the DNS of the CDN, the first DNS request comprising a first URL address for a requested content and mitigating the first DNS request intended for the DNS of the CDN when the first URL address of the first DNS request is not included in the DNS request result file, wherein mitigating the first DNS request comprises terminating the first DNS request.

Another implementation of the present disclosure may take the form of a content delivery network (CDN). The CDN comprises a domain name server (DNS) architecture comprising a plurality of servers and a proxy server associated with and in communication with at least one server of the plurality of servers of the DNS architecture. The proxy server is configured to obtain a record of request results of the at least one server of the plurality of servers, the record comprising a plurality of Uniform Resource Locator (URL) addresses and associated plurality of Internet Protocol (IP) addresses at which requested content of the CDN is accessible to a requesting device and create a DNS request result file associated with the at least one server based on the obtained record of request results, the DNS request result file comprising the plurality of URL addresses and associated plurality of IP addresses. The scrubbing server is further configured to receive a first DNS request intended for the at least one server of the plurality of servers, the first DNS request comprising a first URL address for a requested content and mitigate the first DNS request intended for the at least one server of the plurality of servers when the first URL address of the first DNS request is not included in the DNS request result file, wherein mitigating the first DNS request comprises terminating the first DNS request.

Yet another implementation of the present disclosure may take the form of a networking device. The networking device includes at least one communication port for receiving a first domain name server (DNS) request intended for a particular DNS of a content delivery network (CDN), the first DNS request comprising a first uniform resource locator (URL) address for a requested content available from the CDN, the particular DNS being a component of a DNS architecture of the CDN, a processing device, and a computer-readable medium connected to the processing device configured to store information and instructions. When the instructions are executed by the processing device, the networking device obtains request records from the particular DNS, creates a DNS request result file comprising a plurality of URL addresses and associated plurality of Internet Protocol (IP) addresses at which requested content of the CDN is accessible to a requesting device, and mitigates the first DNS request intended for the particular DNS of the CDN when the first URL address of the first DNS request is not included in the DNS request result file, wherein mitigating the first DNS request comprises terminating the first DNS request.

DETAILED DESCRIPTION

Aspects of the present disclosure involve systems, methods, computer program products, and the like, for providing a proxy server or scrubbing service for an authoritative domain name server (DNS) of a CDN to prevent or otherwise mitigate attacks on the server. The proxy server may receive incoming requests to the authoritative DNS and determine which requests are valid and which are potentially part of an attack on the network. In one embodiment, the proxy server may then "scrub" or otherwise remove the requests of the attack to mitigate the effect of the attack on the network. For example, the proxy server may ignore the request, may direct the request to a "dead-end" server or other device to prevent overloading of the target device, may instruct a device from which the request was sent to discard the request, etc. In general, by receiving the requests before the DNS, an onslaught of traffic directed to the DNS may be rerouted or dismissed before the DNS becomes overwhelmed with the requests during a DDOS attack.

Several methods are discussed herein to aid the proxy server in mitigating an attack or to otherwise provide prevention techniques for the DNS. In one example, the proxy server may provide one or more optional security features for the DNS that are otherwise not enabled by the DNS. For example, several Domain Name Security Extensions (DNSSEC) have been created within servers and other devices within a network. However, not every DNS or other component in a CDN may have the DNSSEC available or enabled, for any number of reasons. Through the proxy server, one or more of the DNSSEC techniques may be applied or provided to the DNS to offer additional security precautions against an attack. For DNS that have enabled one or more of the DNSSEC security features, the proxy server may provide additional bandwidth to handle a larger volume of requests during an attack that the DNS server may not possess. In general, the proxy server or scrubber provides additional security features for a DNS in a CDN that may aid the DNS in mitigating a DDOS or other type of attack.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

Figure 1:
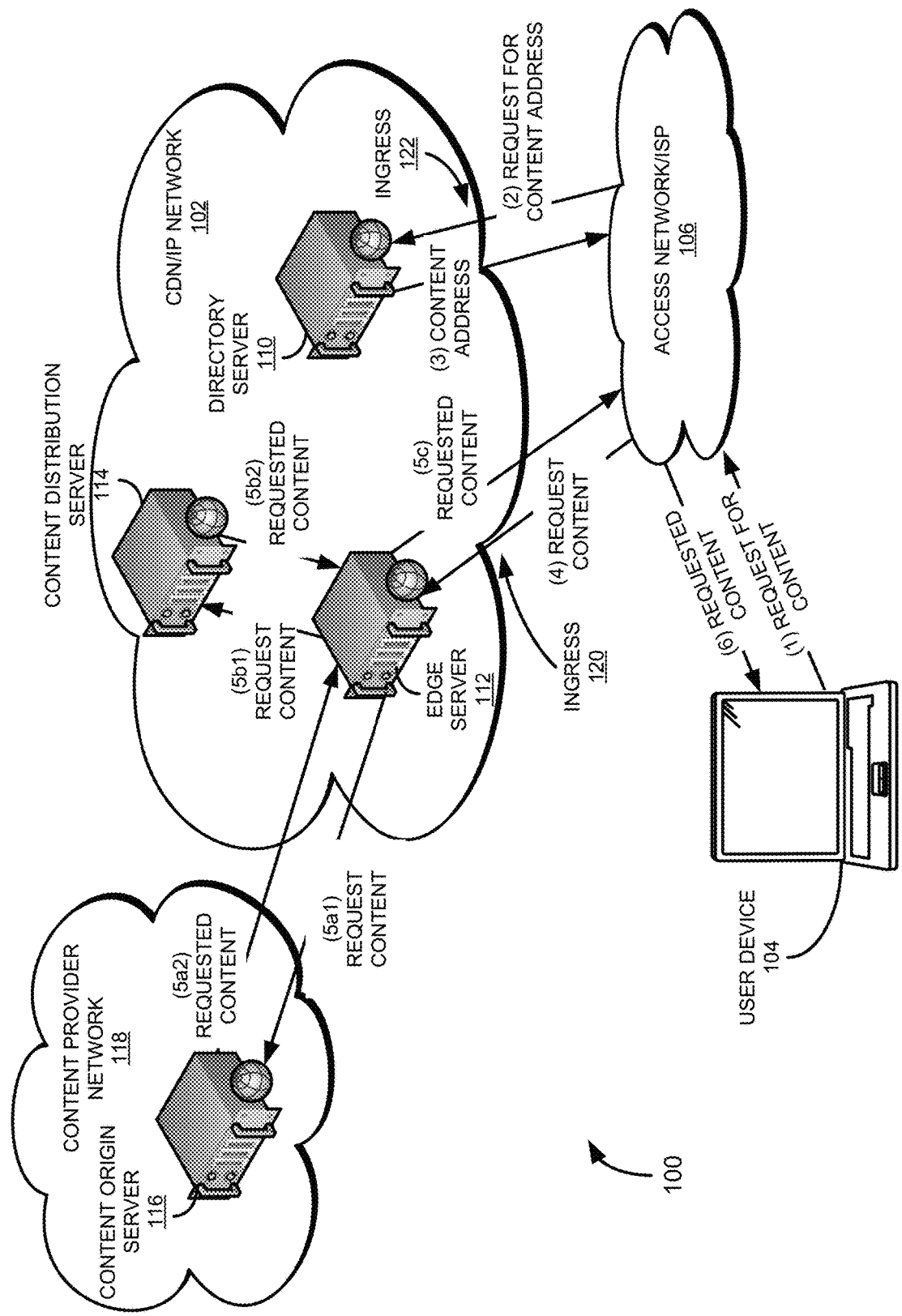
FIG. 1 is an example network environment for distributing content over a telecommunications network.

FIG. 1 is an example network environment 100 for distributing content to one or more users. Although illustrated in FIG. 1 as a content delivery network, it should be appreciated that aspects of the present disclosure may apply to any type of telecommunications network that utilizes IP addresses for connecting an end user to one or more components of the network. For example, aspects of the disclosure may be utilized to connect a user of the network to an endpoint in the network, a conferencing server, a virtual private network device, and the like. Thus, although the CDN architecture is used throughout the document as the example network architecture through which aspects of the present disclosure may be applied; other network architectures and configurations are similarly contemplated.

In one implementation of the network environment 100, a CDN 102 is communicably coupled to one or more access networks 106. In general, the CDN 102 comprises one or more components configured to provide content to a user upon a request and an underlying IP network through which the request is received and the content is provided. The underlying IP network associated with the CDN servers may be of the form of any type IP-based communication network configured to transmit and receive communications through the network and may include any number and types of telecommunications components. In this manner, CDN-based components may be added to an existing IP-based communication network such that the components receive a request for content, retrieve the content from a storage device, and provide the content to the requesting device through the supporting IP network. For simplicity, the use of the term "CDN" throughout this disclosure refers to the combination of the one or more content servers and the underlying IP network for processing and transmitting communications, unless otherwise noted.

In one embodiment, a user device 104 connects to the CDN 102 through one or more access networks 106 to request and receive content or content files from the CDN. The access network 106 may be under the control of or operated/maintained by one or more entities, such as, for example, one or more Internet Service Providers (ISPs) that provide access to the CDN 102. Thus, for example, the access network 106 may provide Internet access to a user device 104. In addition, the access network 106 may include several connections to the IP network of the CDN 102. For example, access network 106 includes access point 120 and access point 122. Also, the user device 104 may be connected to any number of access networks 106 such that access to the CDN 102 may occur through another access network. In general, access to a CDN 102 (or underlying IP network associated with the CDN) may occur through any number of ingress ports to the CDN through any number of access networks.

The CDN 102 is capable of providing content to a user device 104, which is generally any form of computing device, such as a personal computer, mobile device, tablet (e.g., iPad), or the like. Content may include, without limitation, videos, multimedia, images, audio files, text, documents, software, and other electronic resources. The user device 104 is configured to request, receive, process, and present content (step 1). In one implementation, the user device 104 includes an Internet browser application with which a link (e.g., a hyperlink) to a content item may be selected or otherwise entered, causing a request to be sent to a directory server 110 in the CDN 102 (step 2).

The directory or authoritative server 110 responds to the request by providing a network address (e.g., an IP address) where the content associated with the selected link can be obtained (step 3). In one implementation, the directory server 110 provides a domain name system (DNS) service, which resolves an alphanumeric domain name to an IP address. The directory server 110 resolves the link name (e.g., URL or other identifier) to an associated network address from which the user device 104 can retrieve the content. In some instances, the access network 106 may also include a DNS service. The operation of the directory server 110 and access network 106 to resolve requests for content from the user device 104 is discussed in more detail below with reference to FIG. 2.

In one implementation, the CDN 102 includes an edge server 112, which may cache content from another server to make it available in a more geographically or logically proximate location to the user device 104. The edge server 112 may reduce network loads, optimize utilization of available capacity, lower delivery costs, and/or reduce content download time. The edge server 112 is configured to provide requested content to a requestor, which may be the user device 104 possibly via an intermediate device, for example, in the access network 106 (step 4 and step 5c). In one implementation, the edge server 112 provides the requested content that is locally stored in cache. In another implementation, the edge server 112 retrieves the requested content from another source, such as a media access server (MAS) (e.g., a content distribution server 114 (steps 5b1 and 5b2) or a content origin server 116 (steps 5a1 and 5a2) of a content provider network 118). The content is then served to the user device 104 in response to the requests (step 6).

Figure 2:
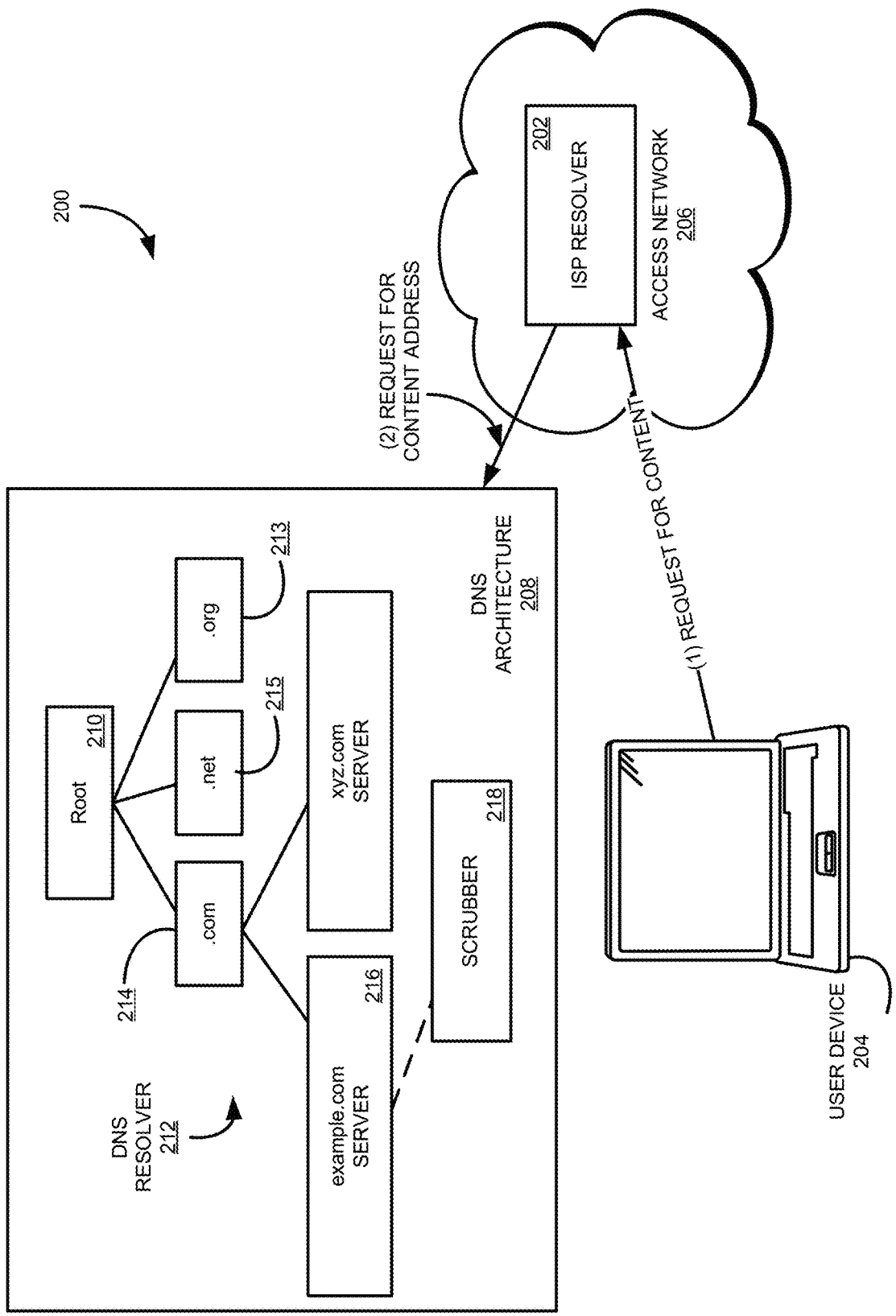
FIG. 2 is an example network environment for providing a scrubbing service to an authoritative domain name server (DNS) of a DNS architecture to mitigate an attack on the DNS.

FIG. 2 is an example network environment 200 for providing a scrubbing service to an authoritative domain name server (DNS) 110 of a DNS architecture 208 to mitigate a DDOS attack on the DNS. The components of the network 200 are similar or the same as components discussed above with reference to the network 100 of FIG. 1. For example, the network environment 200 of FIG. 2 includes a user computing device 204, an access network 206 configured to provide access to a CDN for the computing device, and one or more DNS servers, discussed above. Other components of the network 200 of FIG. 2 may also be included in the network 100 environment of FIG. 1, if not explicitly shown in FIG. 1. The operation of the network 200 and components of the network of FIG. 2 are discussed below.

As mentioned above, a user of a CDN may request content or a content file from the CDN. In one example, a user of the computing device 204 enters a link name (e.g., URL or other identifier) into a browser executed on the computing device. The link name is associated with a network address within the CDN at which the content may be obtained and provided to the computing device. For example, the user or the user device may enter a URL such as http://www.example.com/content into the browser of the computing device 204. Upon entering the URL, the hostname may be extracted by the browser (www.example.com in this particular case), which then sends a request (possibly via an operating system running within the computing device 204) to a DNS resolver 202 associated with the user's access network. The DNS resolver 202 associated with the user's access network is sometimes known as the ISP resolver. In one example, the access network ISP resolver 202 has cached an Internet Protocol (IP) address for the provided URL at which the content available through that URL may be obtained. In other words, the ISP resolver 202 may return an IP address to the computing device 204 to which the computing device may follow to access the content of the URL.

However, while the ISP resolver 202 may be implemented to cache responses, the resolver often does not have a cached IP address for the requested content within the CDN. The ISP resolver 202 may also maintain distinct caches for subsets of computing devices that use the resolver, and the subset used by computing device 204 may not have a cached IP address for the content within the CDN, even though the resolver does have cached IP addresses for other subsets of computing devices. In such cases, the DNS resolver 202 transmits a second DNS request to a DNS server of the CDN to determine an IP address in the CDN at which the content file may be obtained. Such a DNS request is often transmitted to a DNS Architecture 208 to determine the proper authoritative resolver or server from which to obtain the proper IP address. In general, the DNS architecture 208 provides a root node hierarchy of DNS resolvers that respond to DNS requests by either responding with the requested IP address or directing the requesting device through the architecture to the corresponding or proper DNS resolver. Through the DNS architecture 208, the DNS request from the ISP resolver 202 is fulfilled (i.e., the IP address associated with the request is provided to the ISP resolver). In turn, the ISP resolver 202 may cache the returned IP address for future requests received at the resolver and may provide the IP address to the computing device 204 in response to the initial DNS request.

More particularly, when the ISP resolver 202 does not have a cached IP address for the requested content within the CDN, the ISP resolver transmits a DNS request to the root node 210 or server of the DNS architecture 208. The root node 210 may, in some instances, analyze the request and determine a type of URL included in the request. For example, the root node 210 may determine if the URL includes a ".com", ".net", ".org", etc. as a part of the entered URL. Further, the DNS architecture 208 may include a DNS resolver 212 for each of the different types of URLs, such as DNS resolver 213 for .org URL requests, DNS resolver 215 for .net URL requests, and DNS resolver 214 for .com URL requests, and so on. In general, however, the DNS architecture 208 may be arranged in any manner with each DNS resolver handling any type of groups of DNS requests from requesting devices. Upon determining the type of URL request, the root node 210 may return to the ISP resolver 202 a redirect to a corresponding DNS resolver within the architecture 208.

For example, the ISP resolver 202 may receive a request that includes the URL www.example.com. If the ISP resolver 202 does not have an associated IP addressed cached, the resolver may transmit a second DNS request to the root node 210 of the DNS architecture 208, which is a component of the CDN. The root node 210 may analyze the request and determine the request includes a .com-type URL. The root node 210 may then return a referral address, possibly including the actual IP address for another DNS server in the architecture 208 (in this case, DNS 214 for information concerning .com URLs) to the ISP resolver 202. The ISP resolver 202 may then transmit another DNS request to the .com server 214 and, in turn, may receive an IP address for yet another DNS in the architecture 214 in a similar manner as the root server 210. In particular, the .com server 214 may analyze the request and determine that requests that include example.com are fulfilled by a particular DNS 216 in the architecture 208.

The ISP resolver 202 may continue sending DNS requests to the DNS architecture 208 until the DNS 216 corresponding to the received URL is located. In this manner, the ISP resolver 202 is directed to the DNS 216 within the architecture 208 for the particular URL and, once the IP address corresponding to the URL is obtained, the ISP resolver 202 may cache and/or provide the IP address to the computing device 204. With this information, the computing device 204 accesses a device within the CDN at the provided IP address and receives the requested content from the CDN.

In some implementations, a CDN may map an individual domain name to content serving IP addresses within the CDN using a dynamic algorithm or mapping. This mapping may be based on information such as content server status, load, and requesting DNS resolver 202 geographic location and/or logical location. In this manner, the DNS 216 may implement a complex algorithm for mapping a domain name to any number of content serving IP addresses.

It should be appreciated that the DNS architecture 208 illustrated in FIG. 2 is but one example of such an architecture. Rather, the DNS architecture 208 may be in any form and may include any number of DNS devices. Thus, the systems and methods discussed herein may be utilized for any type of DNS architecture 208 of a CDN or other telecommunications network.

As mentioned above, a CDN may come under attack to prevent the operation of some or all of the network. In one instance, a DDOS attack may be perpetrated upon the one or more of the CDN DNS resolvers of the DNS architecture 208. For example, while content for a particular website may be provided from thousands of content servers (generally local to the requesting device), typically only a few servers provide DNS capabilities for a website. Thus, if the DNS resolver that provides the IP addresses for all of the content servers of a website is attacked or overwhelmed, users may not be able to be redirected to the proper content server to retrieve the requested content. As such, DNS resolvers are particularly vulnerable for attacks by a malicious user, such as during DDOS attacks.

One particular type of DDOS attack includes a prepend attack that transmits thousands of requests with a varying prepend to the domain name. For example, during a DDOS attack, hundreds of computing devices may be programmed to transmit URL requests that include a random value followed by ".example.com". However, because the ISP resolver 202 may only have cached the IP address for the .com server 214 and the root node 210, the ISP resolver may direct the URL request directly to the DNS 216 for example.com. When occurring thousands of times per second from hundreds of devices, DNS 216 may become overwhelmed trying to fulfill the DNS requests from the requesting devices and cease responding to most or many of the requests, even legitimate DNS requests from non-attacking devices.

To prevent or otherwise mitigate such attacks on a DNS resolver 216, a scrubber or proxy server 218 may be provided within the DNS architecture 208. In general, the proxy server 218 may receive incoming requests to the DNS 216 and determine which requests are valid and which are potentially part of an attack on the network. In other words, the proxy server 218 may sit logically between ISP resolver 202 (or other computing device transmitting DNS requests) and the target DNS to 216 to receive all requests intended for the target DNS and perform some action on the requests. In one embodiment, the proxy server 218 may "scrub" or otherwise remove the requests of the attack to mitigate the effect of the attack on the network. Further, and as explained in more detail below, the proxy server 218 may also provide one or more additional security features that a DNS of the architecture 208 may not have enabled or available.

As mentioned above, several Domain Name Security Extensions (DNSSEC) have been created within servers and other networking devices to aid in protecting the devices from attack. One such technique, referred to as "NSEC" or "NSEC3", provides a method by which a requesting device may cache empty spaces within a range of domain names associated with a DNS resolver. For example, a DNS resolver may provide an IP address for any number of associated URLs, such as an IP address for www.example.com, another IP address for mail.example.com, another IP address for system2.example.com, etc. Each domain name associated with example.com may be listed by the associated DNS resolver 216 with a corresponding IP address and other directory information, typically stored in a list. Further, many such resolvers associate a unique hash value to each entry in the list of IP addresses. Upon receiving a DNSSEC request, the DNS resolver 216 may return any gaps within the hash values of the list to a requesting device in any form of an NSEC or NSEC3 record. In this manner, a requesting device may receive an indication of domain names for which the DNS resolver has no corresponding IP address. With this information, the requesting device (such as the ISP resolver 202) can prevent transmission of a request to the DNS 216 if the ISP resolver knows the DNS does not have an IP address for the received domain name. In one particular embodiment, the NSEC3 includes a first hash value that defines the start of the empty range and a second hash value that defines the end of the empty range. With this information, the ISP resolver 202 (or any computing device transmitting a DNS request) may slow an attack on a DNS by ignoring requests that fall within the received NSEC3 information.

Although generally available, not all DNS resolvers have DNSSEC available or may not have NSEC or NSEC3 enabled. Thus, in one embodiment of the present disclosure, a proxy server 218 may provide DNSSEC-type protection to DNS resolvers. Through the inclusion of the proxy server 218 in the CDN, DDOS-type attacks on the CDN may be prevented or mitigated such that DNS requests to the CDN may continue unimpeded by the attack. The proxy server 218 may implement any number of techniques to aid in mitigating attacks on the DNS of the CDN. One particular implementation is illustrated below with reference to the flowchart of FIG. 3.

Figure 3:
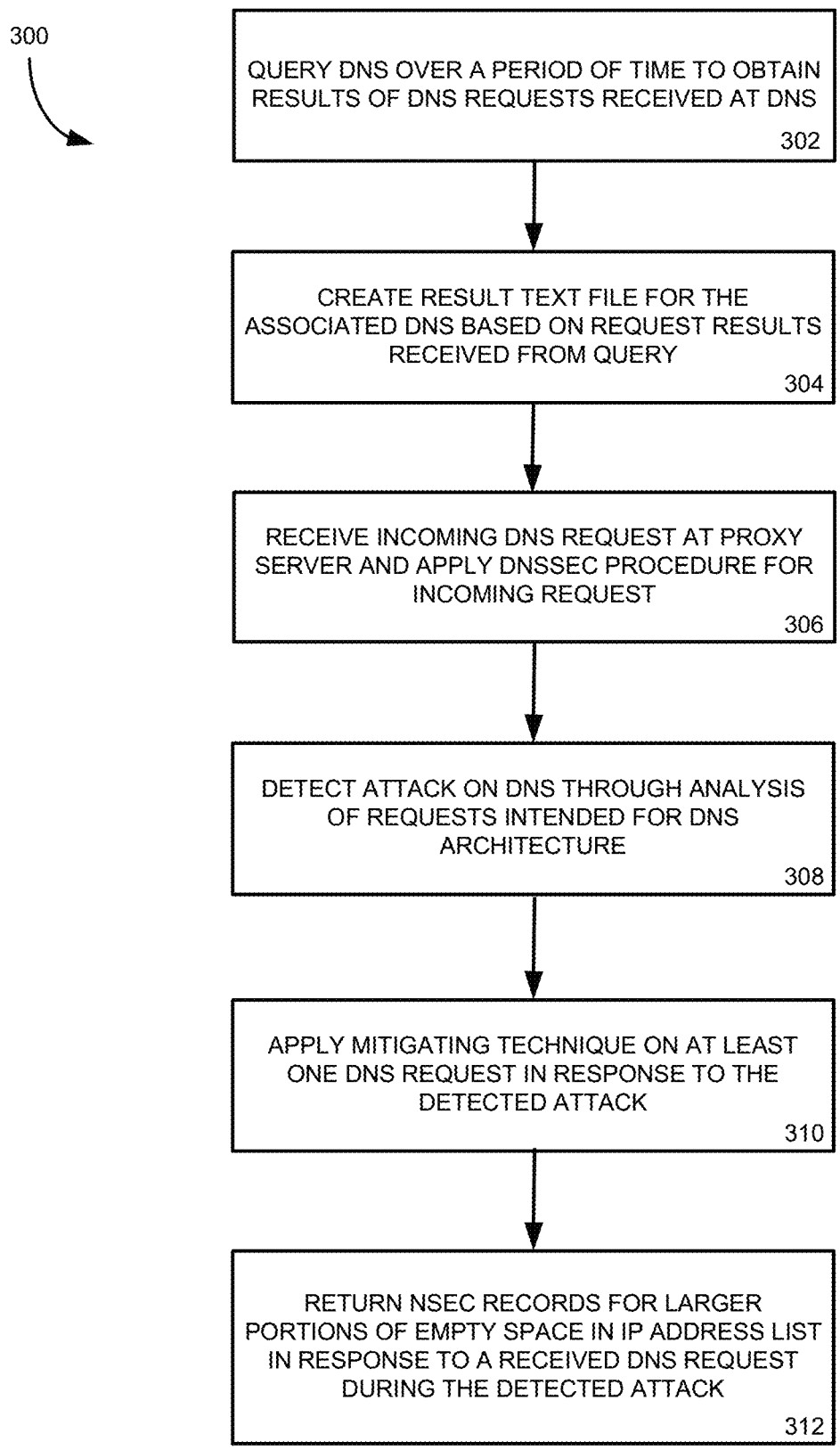
FIG. 3 is a flowchart of a first method for providing a proxy server to an authoritative DNS of an architecture to mitigate an attack on the authoritative DNS.

FIG. 3 is a flowchart of a first method 300 for providing a proxy server to an authoritative DNS of an architecture to mitigate an attack on the authoritative DNS. In one particular embodiment, the operations of the method 300 of FIG. 3 are performed by the proxy server 218 illustrated in the network 200 of FIG. 2. However, the operations may be performed by a single or any number of components of the CDN or connected to the CDN, either through a software program, one or more hardware circuits, or a combination of both hardware and software. Further, the method 300 may be executed for DNS resolvers that have not implemented one or more DNSSEC security techniques.

Beginning in operation 302, the proxy server queries the associated DNS over a period of time to obtain DNS results from the DNS. In one example, the proxy server caches each result provided by the DNS in response to DNS requests from computing devices. In other words, the proxy server receives DNS requests, passes those requests to the DNS, receives the results (such as the corresponding IP address or no result), caches the results, and transmits the results to the requesting computing device. In another example, the proxy server may generate and transmit DNS requests to the DNS to obtain the results from the DNS.

With the obtained results from the DNS, the proxy server may create a results list text file for the associated DNS in operation 304. In one embodiment, the results list for the proxy server matches the IP address list of the associated DNS. Thus, in yet another embodiment, the DNS may provide the IP address list of the DNS to the proxy server for use by the proxy server. In operation 306, the proxy server may provide one or more DNSSEC techniques for the DNS server for incoming requests. For example, the proxy server may return one or more NSEC results for a request to the DNS. Thus, the proxy server may determine or receive hash values for each of the entries in the list and provide empty ranges within the hash values in response to a NSEC request. The requesting device may then cache the NSEC result, which may prevent malicious requests from reaching the DNS during a DDOS attack.

In an alternate embodiment, the proxy server may generate an estimated valid domain list from the results received over the period of time. For example, the particular DNS associated with the proxy server may not be able to return NSEC results. However, by mapping the obtained results over the period of time, the proxy server may estimate the empty ranges within the results list and provide those estimated ranges in response to a NSEC request. Further, the proxy server may be configured to return less than the full empty range in the IP address list in response to a NSEC request. In some circumstances, a company or operator of a website may not want to publish the full NSEC results as such information may provide a map of the domain names belonging to a given parent domain name. In such instances, the DNS may return NSEC results that only partially define the empty spaces within the IP address list. In this manner, the operator of the DNS may protect certain information contained within the NSEC result. In a similar manner, the proxy server may also be configured to provide NSEC results that are less than the entire empty space within the IP address list.

In operation 308, the proxy server may detect a possible attack on a DNS of the CDN. The detection of the attack may occur at the proxy server (such as through a detection of a sharp increase in DNS requests sent to the DNS or an increase in the rate of queries for invalid domain names) or may occur at another device within the network and provided to the proxy server. In another embodiment, the indication of an attack on the DNS may be provided by an operator of a network or the CDN. Regardless of source of detection, the proxy server may execute one or more procedures in response to the detected attack.

In one example, the proxy server may act as a scrubbing device when an attack is detected on the DNS by only returning results that are included in the proxy server results list in operation 310. In other words, only DNS requests for domain names that have previously been served by the DNS may be provided by the proxy server when under attack. Other requests are subsequently scrubbed or ignored by the proxy server. Further, because the proxy server may be configured to handle a larger bandwidth of requests, the proxy server may absorb the attack more effectively than the DNS. In one particular example, a proxy server may serve many DNS to protect several DNS from potential DDOS attacks. As most attacks occur on a particular target at a time, the proxy server can protect many DNS of the CDN without becoming overwhelmed during a single attack.

In another example (such as in operation 312), the size of the empty space returned in response to NSEC/NSEC3 requests may be increased when an attack is occurring. By providing larger portions of the empty spaces in the IP address list of the DNS in response to a NSEC request, ISP resolvers or other requesting computing devices may cache the non-existence space such that those devices stop requesting the DNS for IP addresses when requests are made within those empty spaces. This operation limits the attack away from the proxy server and DNS to the requesting devices. Thus, not only does the proxy server provide NSEC protection to the DNS, but the protection may be adjusted based on the occurrence of an attack on the DNS to further mitigate the attack.

Figure 4:
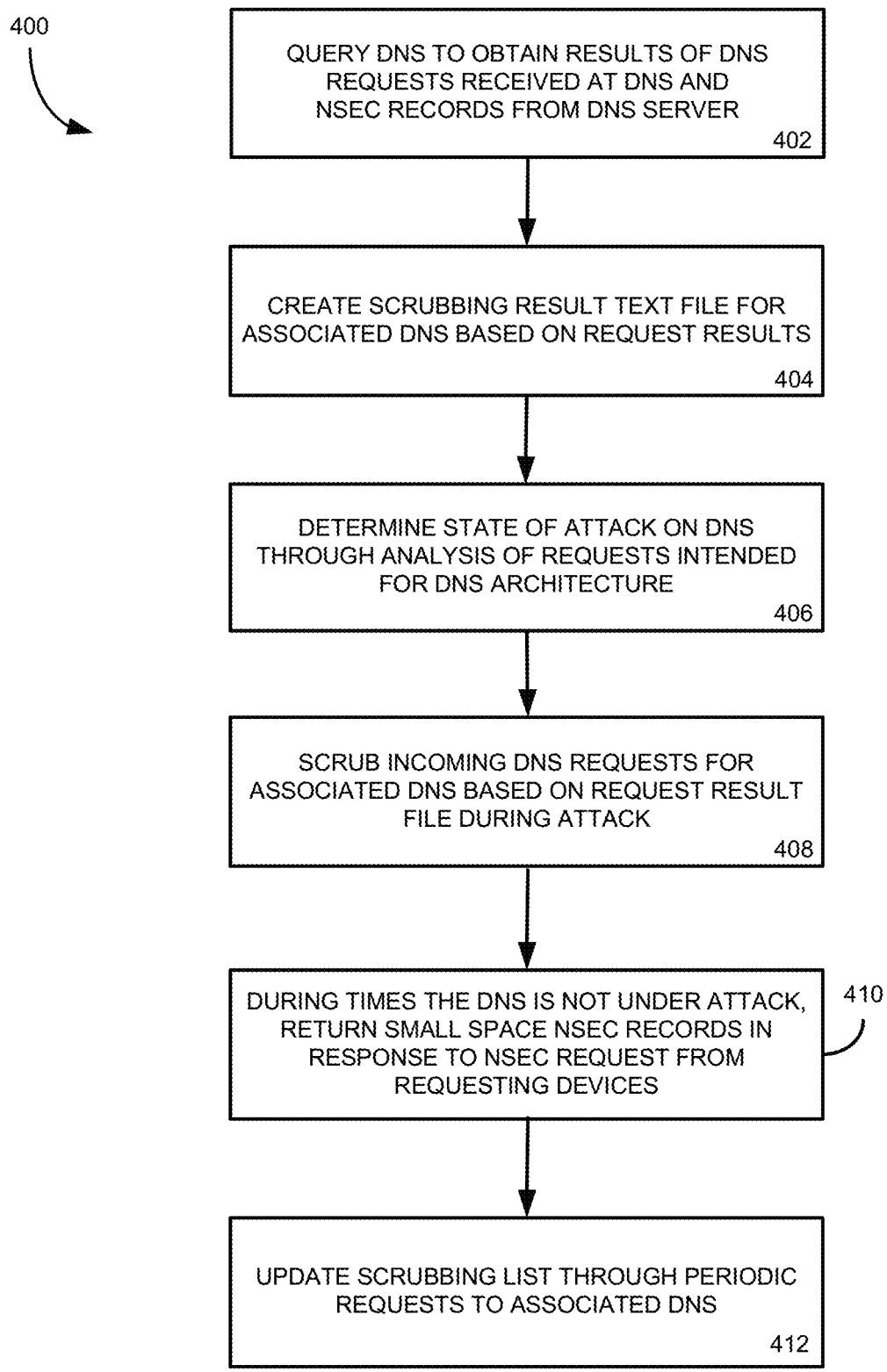
FIG. 4 is a flowchart of a second method for providing a proxy server to an authoritative DNS of an architecture to mitigate an attack on the authoritative DNS.

In general, the method 300 of FIG. 3 is utilized by the proxy server when the protected DNS does not implement DNSSEC techniques. However, the proxy server may also be utilized for DNS that include DNSSEC techniques. In particular, FIG. 4 is a flowchart of a second method 400 for providing a proxy server to an authoritative DNS of an architecture to mitigate an attack on the authoritative DNS. Similar to the method 300 of FIG. 3, the operations of the method 400 of FIG. 4 may be performed by the proxy server or any other and number of devices associated with the CDN.

Beginning in operation 402, the proxy server receives or otherwise obtains NSEC/NSEC3 results and valid domain information from the associated DNS server. In one particular example, the DNS server may provide the NSEC results to the proxy server either in response to an instruction from an operator of the DNS or in response to a request for the records from the proxy server. In operation 404, the proxy server creates an IP address list from the received records. In one particular embodiment, the IP address list of the proxy server is the same or similar to the valid domain list of the associated DNS.

In operation 406, the proxy server (similar to that described above) receives DNS requests intended for the DNS from one or more computing devices during operation of the CDN. The DNS requests include requests for an IP address for a device that may provide content in response to a received URL. When a request is received, the proxy server may determine if the request is a valid request and transmit the request to the DNS for resolution. However, if the received request is determined to not be valid by the proxy server (such as during an attack on the DNS), the request may be ignored or redirected to another networking device in operation 408. In this manner, the proxy server may scrub incoming requests to the DNS to prevent malicious or harmful requests from reaching the DNS and potentially overloading the device. This scrubbing technique may be provided at all times or during occurrences of a detected attack (such as a DDOS) attack on the DNS.

Further, in operation 410, the proxy server may provide a privacy feature for the DNS request in response to received NSEC records. In particular and as described above, some DNS operators or content providers may prefer to not provide the entire empty range of the IP address list in response to a NSEC request as such information may be utilized to map the IP addresses of a content provider. Thus, the proxy server may be configured to return less than all of the empty space in the IP address list in response to a NSEC request. By providing less than the full empty range, the entirety of the IP address list may be preserved by the content provider through the use of the proxy server.

The proxy server may also be configured to periodically update the scrubbing IP address list maintained by the server in operation 412. In particular, the DNS may update or alter the IP address list maintained by the DNS during operation. For example, the DNS may execute one or more load balancing procedures that balance requests for content across several content servers such that the answer to a particular DNS request may vary from one moment to another. Similarly. The DNS may provide geographically-sensitive responses to DNS requests in an attempt to connect a request for content to a content server that is geographically close to the requester's computing device. To maintain a current response list for the DNS, the proxy server may periodically transmit DNS requests to the DNS to retrieve the response from the DNS. Such requests may be for the entirety of the valid domain list, or may be for subsets of the valid domain list. Regardless of the method employed to update the IP address list of the DNS, the proxy server may attempt to keep current response records of the DNS to ensure proper scrubbing of incoming DNS requests.

Figure 5:
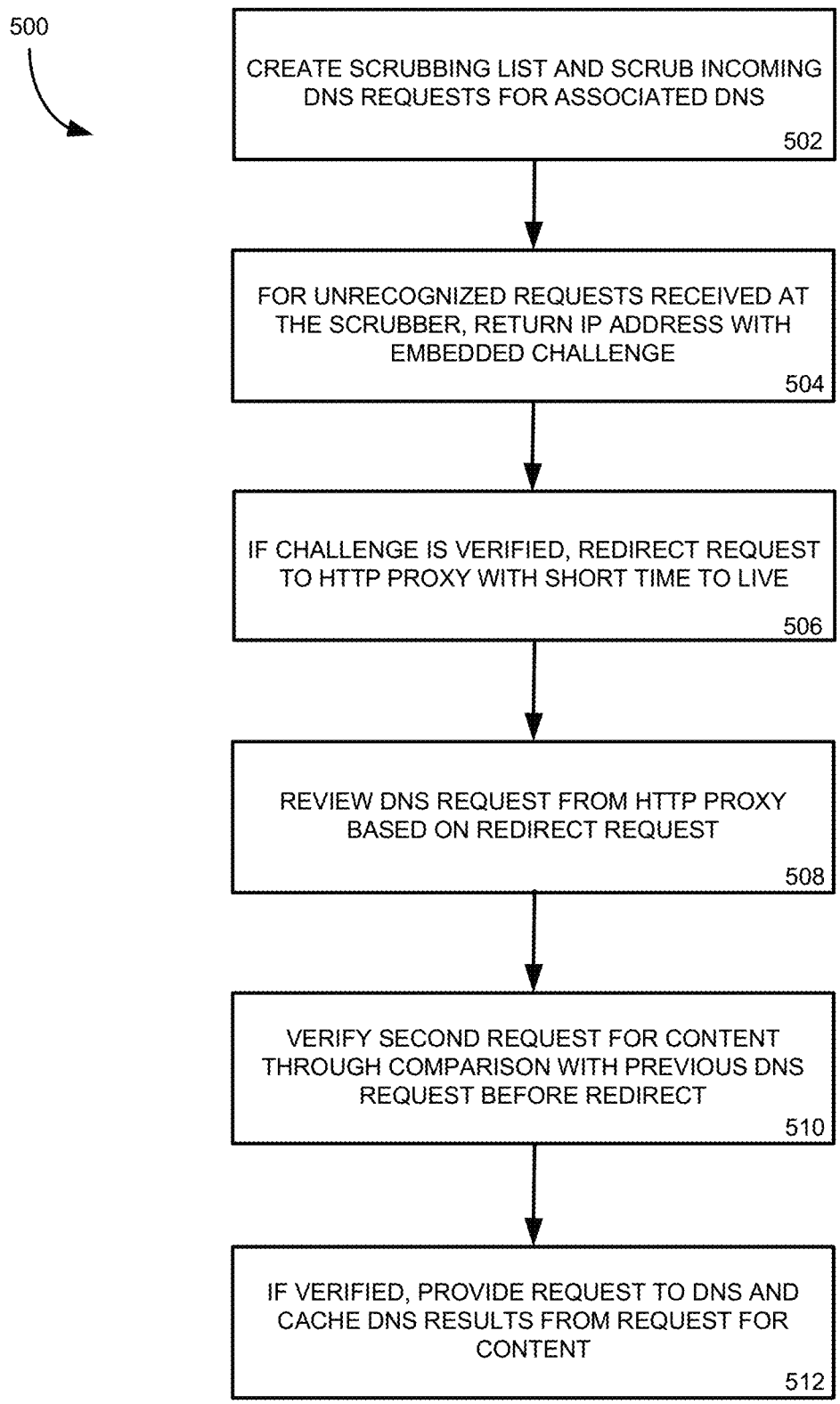
FIG. 5 is a flowchart of a third method for providing a proxy server to an authoritative DNS of an architecture to mitigate an attack on the authoritative DNS.

In some instances, the proxy server may also request verifying information from a requesting device (such as a user's computer or the ISP resolver) to verify that DNS requests received at the DNS are legitimate. FIG. 5 is a flowchart of a third method 500 for providing a proxy server to an authoritative DNS of an architecture to mitigate an attack on the authoritative DNS. As above, the operations of the method 500 may be performed by a proxy server to a DNS in the DNS architecture, or may be performed by any type or number of networking devices. Further, one or more of the operations described in the method 500 may or may not be performed in response to receiving a DNS request to verify the legitimacy of the request.

Beginning in operation 502, the proxy server creates a scrubbing domain list of the DNS and performs one or more of the above described scrubbing and protection techniques. In addition, the DNS proxy server may perform operation 504 when the server receives a DNS request intended for the DNS that the proxy server does not recognized or for which the proxy server does not have a response result. In response, the proxy server may provide a generated IP address or alias (such as a canonical name, or CNAME) that directs the requesting device back to the proxy server. The generated IP address or alias may also include an embedded hash value or other created verification value. The requesting device, upon the redirect, may provide the IP address with the verification value to the proxy server at which point the proxy server may extract the verification value and verify that the requesting device is a legitimate requestor. This may aid in identifying malicious actors during an attack as such requesting devices may not be programmed to execute any responses received by the proxy server. Rather, attacking devices intend on simply overwhelming the DNS without actually following the returned response to receive the requested content. In this manner, a verification challenge may be provided to the requesting device to ensure the device includes a legitimate DNS request.

Further, in operation 506, the proxy server may return a result to the requesting device that directs the device to a HTTP-type proxy networking device. In general, HTTP devices in the network require a browser operating on the requesting device to communicate with the HTTP device. However, many computing devices utilized in a DDOS attack are programmed to merely transmit the request without using a browser. As such, the attacking device may not be programmed to connect to an HTTP proxy server. Further, the returned result to the requesting device may include a short caching period ("time to live") such that the ISP resolver that receives the result may cache the redirect instruction to the HTTP proxy server for a short time period. The short caching period set by the DNS result ensures that additional DNS requests received at the ISP resolver for that particular URL after the caching period has expired are directed back to the DNS proxy server for resolution. In still another embodiment, the DNS proxy server may return no results to the ISP resolver with a short caching period. This operates to deny any DNS request for that URL received at the ISP resolver from reaching the proxy server until the caching period has expired.

As explained above, attacking devices may not follow a received result in response to a DNS request. Thus, by redirecting the requesting device to the HTTP proxy server, malicious DNS requests may be prevented from reaching the protected DNS. However, legitimate DNS requests may still be processed. Thus, in operation 508, the DNS proxy server may receive a DNS request from the HTTP proxy server to which the requesting device was redirected. In operation 510, the DNS proxy device may compare the received DNS request referenced by the request on the HTTP proxy server to previously received requests to ensure that the DNS proxy server previously provided the redirect to the requesting computing device. If verified, the DNS proxy server may retrieve the DNS result from the DNS and cache the result for future requests received at the DNS proxy server. The DNS proxy server may also provide the retrieved DNS result to the HTTP proxy server for the HTTP proxy server to provide to the requesting device. Additional requests received at the DNS proxy server may then be served as the result for the request is now cached at the DNS proxy.

Figure 6:
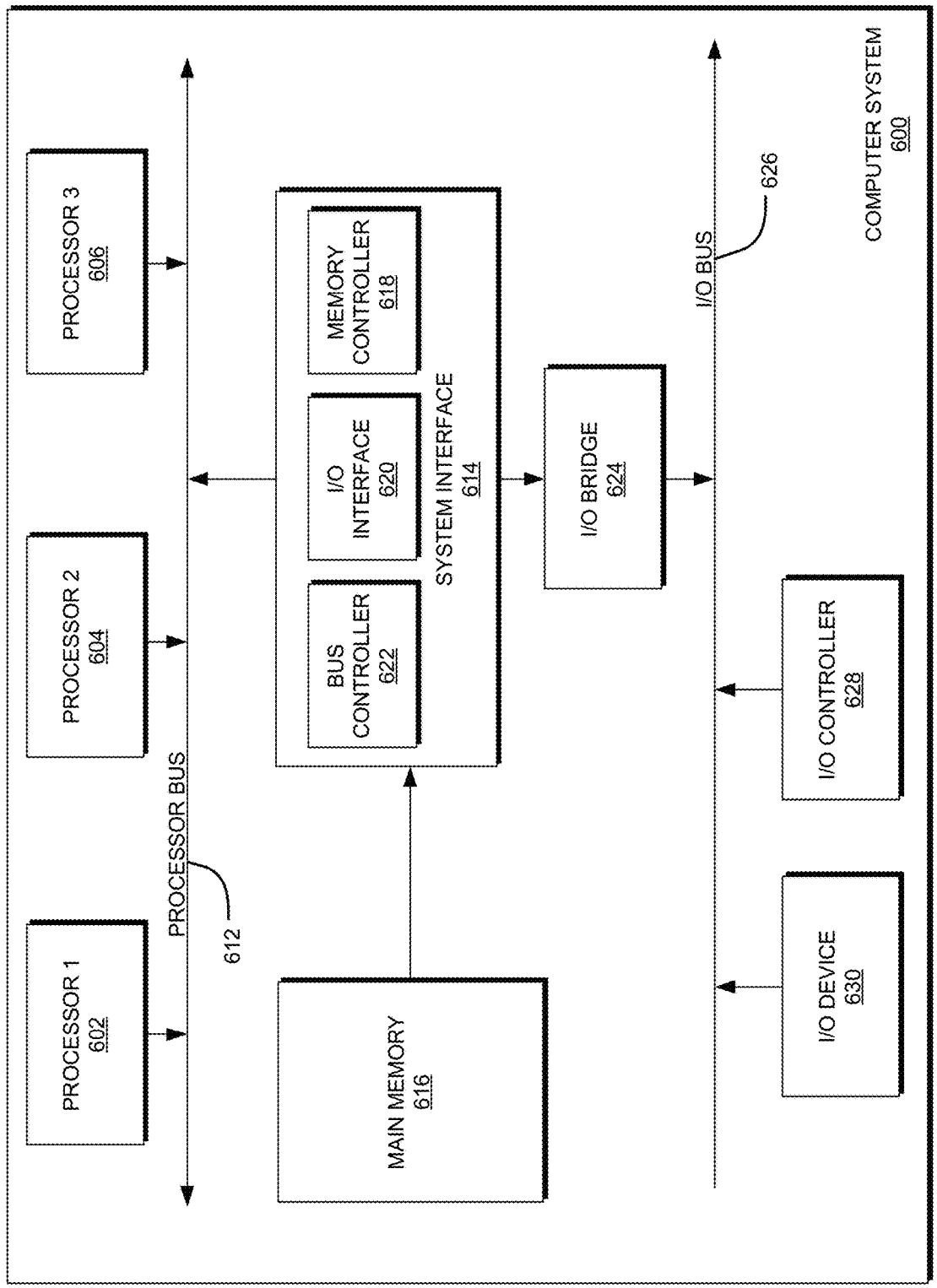
FIG. 6 is a diagram illustrating an example of a computing system which may be used in implementing embodiments of the present disclosure.

Through the systems and methods described above, a DNS proxy server is provided in a DNS architecture of a CDN to aid in preventing or mitigating attacks on the DNS architecture. The proxy server may receive incoming requests to the authoritative DNS and determine which requests are valid and which are potentially part of an attack on the network. In one embodiment, the proxy server may then "scrub" or otherwise remove the requests of the attack to mitigate the effect of the attack on the network. For example, the proxy server may ignore the request, may direct the request to a "dead-end" server or other device to prevent overloading of the target device, may instruct a device from which the request was sent to discard the request, etc. In general, by receiving the requests before the DNS, an onslaught of traffic directed to the DNS may be rerouted or dismissed before the DNS becomes overwhelmed with the requests during a DDOS attack FIG. 6 is a block diagram illustrating an example of a computing device or computer system 600 which may be used in implementing the embodiments of the components of the network disclosed above. For example, the computing system 600 of FIG. 6 may be the DNS proxy server discussed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 614 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 640, as illustrated.

I/O device 640 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

We claim:

1. A method for operating a telecommunications network, the method comprising:
   obtaining request records from a domain name server (DNS) of a content delivery network (CDN), the DNS being of a DNS architecture of the CDN;
   creating a DNS request result file comprising a plurality of domain name addresses and associated plurality of Internet Protocol (IP) addresses at which requested content of the CDN is accessible to a requesting device;
   receiving, at a proxy server, a first DNS request intended for the DNS of the CDN, the first DNS request received from a requesting device and comprising a first domain name address for a requested content;
   determining whether the first domain name address of the first DNS request is included in the DNS request result file; and
   processing the first DNS request intended for the DNS of the CDN when the first domain name address of the first DNS request is not included in the DNS request result file, wherein processing the first DNS request comprises:
      transmitting a redirect instruction to the requesting device that indicates an IP address associated with a hypertext transfer protocol (HTTP) server;
      receiving, at the proxy server, a second DNS request from the HTTP server; and determining whether the second DNS request from the HTTP server is a redirection of the first DNS request.

2. The method of claim 1 further comprising:
receiving a Domain Name System Security Extension (DNSSEC) request from the requesting device; and
transmitting a portion of the DNS request result file to the requesting device in response to the DNSSEC request.

3. The method of claim 2 wherein the portion of the DNS request result file comprises less than all of a range of domain names of the DNS request file.

4. The method of claim 3 further comprising:
detecting an attack on the DNS from a plurality of requesting devices; and
transmitting an entire DNS request result file to the requesting device in response to the DNSSEC request.

5. The method of claim 1 further comprising:
receiving a third DNS request intended for the DNS of the CDN, the third DNS request comprising a third domain name address for a requested content; and
transmitting the third DNS request to the DNS when the domain name address of the third DNS request is included in the DNS request result file.

6. The method of claim 1 wherein the redirect instruction further comprises a designated caching period instruction for the requesting device, the requesting device caching the IP address associated with the HTTP server for the designated caching period.

7. A content delivery network (CDN) comprising:
a domain name server (DNS) architecture comprising a plurality of servers; and
a proxy server associated with and in communication with at least one server of the plurality of servers of the DNS architecture, the proxy server configured to:
obtain a record of request results of the at least one server of the plurality of servers, the record comprising a plurality of domain name addresses and associated plurality of Internet Protocol (IP) addresses at which requested content of the CDN is accessible to a requesting device;
create a DNS request result file associated with the at least one server based on the obtained record of request results, the DNS request result file comprising the plurality of domain name addresses and associated plurality of IP addresses;
receive a first DNS request intended for the at least one server of the plurality of servers, the first DNS request comprising a first domain name address for a requested content;
determine whether the first domain name address of the first DNS request is included in the DNS request result file; and
process the first DNS request intended for the at least one server of the plurality of servers when the first domain name address of the first DNS request is not included in the DNS request result file, wherein processing the first DNS request comprises:
terminating the first DNS request and transmitting a redirect instruction to the requesting device that indicates an IP address associated with a hypertext transfer protocol (HTTP)-type server;
receiving, at the proxy server, a second DNS request from the HTTP-type server; and
determining whether the second DNS request from the HTTP-type server is a redirection of the first DNS request.

8. The content delivery network of claim 7 wherein the proxy server is further configured to:
receive a Domain Name System Security Extension (DNSSEC) request from the requesting device; and
transmit a portion of the DNS request result file to the requesting device in response to the DNSSEC request.

9. The content delivery network of claim 8 wherein the portion of the DNS request result file comprises less than all of a range of domain names of the DNS request file.

10. The content delivery network of claim 7 wherein obtaining a record of request results of the at least one server of the plurality of servers comprises:
monitoring a plurality of requests for content intended for at least one server of the plurality of servers over a period of time; and
storing the plurality of requests for content intended for at least one server of the plurality of servers over the period of time.

11. The content delivery network of claim 7 wherein the proxy server is further configured to:
update the DNS request result file with newly received DNS requests intended for the at least one server of the plurality of servers.

12. The content delivery network of claim 9 wherein the proxy server is further configured to:
detect an attack on the at least one server of the plurality of servers from a plurality of requesting devices; and
transmit an entire DNS request result file to the requesting device in response to the DNSSEC request.

13. The content delivery network of claim 12 wherein the attack on the at least one server of the plurality of servers is a distributed denial of service-type attack.

14. The content delivery network of claim 7 wherein the proxy server is further configured to:
receive a third DNS request intended for the at least one server of the plurality of servers, the third DNS request comprising a second domain name address for a requested content; and
transmit the third DNS request to the at least one server of the plurality of servers when the third domain name address of the third DNS request is included in the DNS request result file.

15. A networking device comprising:
at least one communication port for receiving a first domain name server (DNS) request intended for a particular DNS of a content delivery network (CDN), the first DNS request comprising a first domain name address for a requested content available from the CDN, the particular DNS being a component of a DNS architecture of the CDN;
a processing device; and
a computer-readable medium connected to the processing device configured to store information and instructions that, when executed by the processing device, performs the operations of:
obtaining request records from the particular DNS;
creating a DNS request result file comprising a plurality of domain name addresses and associated plurality of Internet Protocol (IP) addresses at which requested content of the CDN is accessible to a requesting device;
determining whether the first domain name address of the first DNS request is included in the DNS request result file; and
processing the first DNS request intended for the particular DNS of the CDN when the first domain name address of the first DNS request is not included in the DNS request result file, wherein processing the first DNS request comprises:

transmitting a redirect instruction to the requesting device that indicates an IP address associated with a hypertext transfer protocol (HTTP) server;

receiving, at the proxy server, a second DNS request from the HTTP server; and determining whether the second DNS request from the HTTP server is a redirection of the first DNS request.

16. The networking device of claim 15 wherein the instructions further cause the processing device to perform the operations of:

receiving a Domain Name System Security Extension (DNSSEC) request from the requesting device; and transmitting a portion of the DNS request result file to the requesting device in response to the DNSSEC request.

17. The networking device of claim 16 wherein the portion of the DNS request result file comprises less than all of a range of IP addresses of the DNS request file.

18. The method of claim 1, wherein processing the first DNS request further includes:

transmitting to the requesting device a first IP address with an embedded verification value, the first IP address redirecting the requesting device back to the proxy server; and verifying the requesting device based on whether the proxy server receives a redirected request for the requested content from the requesting device that includes the embedded verification value.

19. The content delivery network of claim 7, wherein processing the first DNS request further includes:

transmitting to the requesting device a first IP address with an embedded verification value, the first IP address redirecting the requesting device back to the proxy server; and verifying the requesting device based on whether the proxy server receives a redirected request for the requested content from the requesting device that includes the embedded verification value.

\* \* \* \* \*